US006806588B2

(12) United States Patent
Amano et al.

(10) Patent No.: US 6,806,588 B2
(45) Date of Patent: Oct. 19, 2004

(54) POWER CONTROLLER FOR A VEHICLE

(75) Inventors: Masahiko Amano, Hitachioota (JP); Ryoso Masaki, Hitachi (JP); Yasuo Morooka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 09/793,560

(22) Filed: Feb. 27, 2001

(65) Prior Publication Data

US 2001/0019224 A1 Sep. 6, 2001

(30) Foreign Application Priority Data

Mar. 1, 2000 (JP) ........................................ 2000-055370

(51) Int. Cl.[7] .............................................. H02H 7/18
(52) U.S. Cl. .................................................. 307/10.7
(58) Field of Search ............................... 307/10.1, 10.7, 307/48, 66; 320/136, 134, 104, 132, 103

(56) References Cited

U.S. PATENT DOCUMENTS

| 3,667,025 | A | * | 5/1972 | Campbell et al. .......... 320/123 |
| 3,900,784 | A | * | 8/1975 | Seike ........................ 320/123 |
| 3,904,947 | A | * | 9/1975 | Crews ........................ 320/138 |
| 4,210,856 | A | * | 7/1980 | Taylor ........................ 320/123 |
| 4,743,830 | A | * | 5/1988 | Lakey ........................ 320/104 |
| 4,937,528 | A | * | 6/1990 | Palanisamy ................. 320/132 |
| 5,032,825 | A | * | 7/1991 | Kuznicki .................... 320/136 |
| 5,130,659 | A | * | 7/1992 | Sloan ........................ 320/136 |
| 5,293,076 | A | * | 3/1994 | Fukui ........................ 290/40 C |
| 5,488,283 | A | * | 1/1996 | Dougherty et al. ........ 307/10.1 |
| 5,561,362 | A | * | 10/1996 | Kawamura et al. ......... 320/134 |
| 5,566,757 | A | * | 10/1996 | Yoshida ..................... 180/65.4 |
| 5,739,668 | A | * | 4/1998 | Nishikiori ................... 320/111 |
| 5,744,963 | A | * | 4/1998 | Arai et al. .................. 320/146 |
| 5,783,872 | A | * | 7/1998 | Blair ......................... 307/46 |
| 5,808,428 | A | * | 9/1998 | Ito et al. .................... 318/139 |
| 5,823,282 | A | * | 10/1998 | Yamaguchi ................. 180/65.2 |
| 6,057,688 | A | * | 5/2000 | Kawai et al. ............... 324/426 |
| 6,392,380 | B2 | * | 5/2002 | Furukawa et al. .......... 320/104 |
| 6,400,589 | B2 | * | 6/2002 | Abo et al. .................. 363/65 |

FOREIGN PATENT DOCUMENTS

| FR | 2 777 395 A1 | * 10/1999 |
| JP | 04-347536 | 12/1992 |
| JP | 5-25947 | 2/1993 |
| JP | 05-58508 | 3/1993 |
| JP | 05-336252 | 12/1993 |
| JP | 07-274411 | 10/1995 |
| JP | 9-319784 | * 6/1999 |
| JP | 11-334497 | 12/1999 |

OTHER PUBLICATIONS

Application No.: 09–319784, Controller for Electric Vehicle, Inventor: Okamura Makoto, Pub.date: Jun. 2, 1999.*
English translation of abstract of FR 2 777 395 A1, Traction Battery Charging System for Electric Vehhicle, Pub. date: Octobe 15, 1999.*

* cited by examiner

Primary Examiner—Gregory J. Toatley, Jr.
(74) Attorney, Agent, or Firm—Crowell & Moring LLP

(57) ABSTRACT

A power controller for a vehicle can operate electrical load upon stopping of engine or turning OFF of a key switch, without lowering of remaining capacity of a main battery. The control system has a control portion controlling operation of a power generator and an electrical load mounted on an automotive vehicle. The control system also includes remaining capacity measuring means for measuring a remaining capacity of a battery. The control portion energizes a predetermined power load when an engine is stopped or a key switch is held OFF, and operation of the power load is stopped when a remaining capacity of the battery measured by the remaining capacity measuring means becomes smaller than a predetermined value.

9 Claims, 4 Drawing Sheets

POWER CONTROLLER FOR A VEHICLE

BACKGROUND OF THE INVENTION

1. Field of the Invention

The present invention relates generally to a power controller for a vehicle. More particularly, the invention relates to a control system for an automotive power source system suitable for controlling an automotive power source having a higher voltage and higher capacity battery than the conventional 14V system, such as 42V system.

2. Description of the Related Art

In recent years, to accommodate the increasing number of electrically actuated on-vehicle devices, such as electrically driven power steering, electrically actuated air conditioner and so forth, and the increasing capacity thereof, it has been proposed to provide a 42V automotive power supply in addition to the convention 14 power supply. In the 42V power supply, since the voltage is three times higher than that of the 14V system, the current can be reduced by one third, reducing power loss and saving on the weight of a harness. Also, adaptation for a large capacity load is facilitated, and the capacity of the battery is larger than that of the conventional battery, and a nickel hydride battery, lithium ion battery and so forth can be applied in place of the conventional lead acid battery for the future. Recently, it has been proposed to provide a system having both a main battery of a 42V system and an auxiliary battery of a 14V system, with both batteries connected through a DC/DC converter for controlling charging from the main battery to the auxiliary battery.

However, in the recently proposed system, the following problem can be encountered. Namely, by utilizing the large capacity of the battery of a 42V. system, it is possible to operate an electrical load, such as an electrically actuated air conditioner, even while the engine is not driven. However, when the remaining capacity of the main battery becomes small, it is impossible to start the engine.

Also, for example, when the lamps are connected to the 14V system, it becomes necessary to turn the lamps ON even when the key switched remains OFF. However, when the capacity of the auxiliary battery is small, remaining capacity is instantly lowered to the lower remaining capacity of the main battery when the lamps are kept ON.

SUMMARY OF THE INVENTION

One object of the present invention is to provide a control system for an automotive power supply which can operate an electrical load upon stopping of engine or turning OFF of a key switch, while preventing lowering of the remaining capacity of the main battery.

A second object of the present invention is to provide a control system for an automotive power supply which can operate an electrical load of a low voltage system while a key switch remains OFF, even when the capacity of an auxiliary battery is small.

In order to accomplish the above-mentioned objects, according to one aspect of the present invention, a control system for an automotive power supply having a control portion controlling operation of a power generator and an electrical load mounted on an automotive vehicle, comprises:

remaining capacity measuring means for measuring a remaining capacity of a battery, the control portion driving a predetermined power load when an engine is stopped or a key switch is held OFF, and operation of the power load being stopped when the remaining capacity of the battery (measured by the remaining capacity measuring means) falls below a predetermined value.

With the construction set forth above, when the engine is stopped or the key switch is OFF, operation of the power load is possible, and lowering of the remaining capacity of the main battery can be prevented.

Preferably, the control portion may set a plurality of threshold values for the remaining capacity corresponding to priority of the power load, to sequentially stop the power load with a low priority, in sequential order according to a reduction of remaining capacity of the battery.

Preferably, the control portion may operate a predetermined power load when the engine is stopped or the key switch is OFF, to start up the engine when the remaining capacity of the battery is lowered below a predetermined value.

Preferably, the control system may comprise another switch for determining whether starting of engine is permitted when the key switch remains OFF. When the key switch is OFF, the control portion may start up the engine only when the other switch is ON.

Preferably, the control system may further comprise means for inputting a remaining amount of fuel information, and the control portion may stop the engine when remaining amount of fuel falls below a predetermined value after starting the engine.

Further preferably, the control portion may stop operation of the power load when the remaining capacity of the battery becomes smaller than a predetermined value, and stops operation of the control system per se.

Preferably, the control portion may resume operation when the key switch is turned ON after once stopping the operation of the control portion per se.

According to another aspect of the present invention, a control system for an automotive power supply having a control portion controlling a power generator or power load mounted on an automotive vehicle, comprises:

remaining capacity measuring means for measuring a remaining capacity of a battery, a main battery, an auxiliary battery and a voltage converter for charging from the main battery via the auxiliary battery, the control portion operating the voltage converter when engine is stopped or key switch is held OFF, and stopping operation of the voltage converter when remaining capacity of the main battery falls below a predetermined value.

BRIEF DESCRIPTION OF THE DRAWINGS

The present invention will be understood more fully from the detailed description given hereinafter and from the accompanying drawings of the preferred embodiment of the present invention, which, however, should not be taken to be limiting to the invention, but are for explanation and understanding only.

DESCRIPTION OF THE PREFERRED EMBODIMENT

The present invention will be discussed hereinafter in detail in terms of the preferred embodiment of a control system for an automotive power source system according to the present invention, with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

The construction and operation of one embodiment of a control system for an automotive power supply will be discussed hereinafter with reference to FIGS. 1 to 3.

Figure 1:
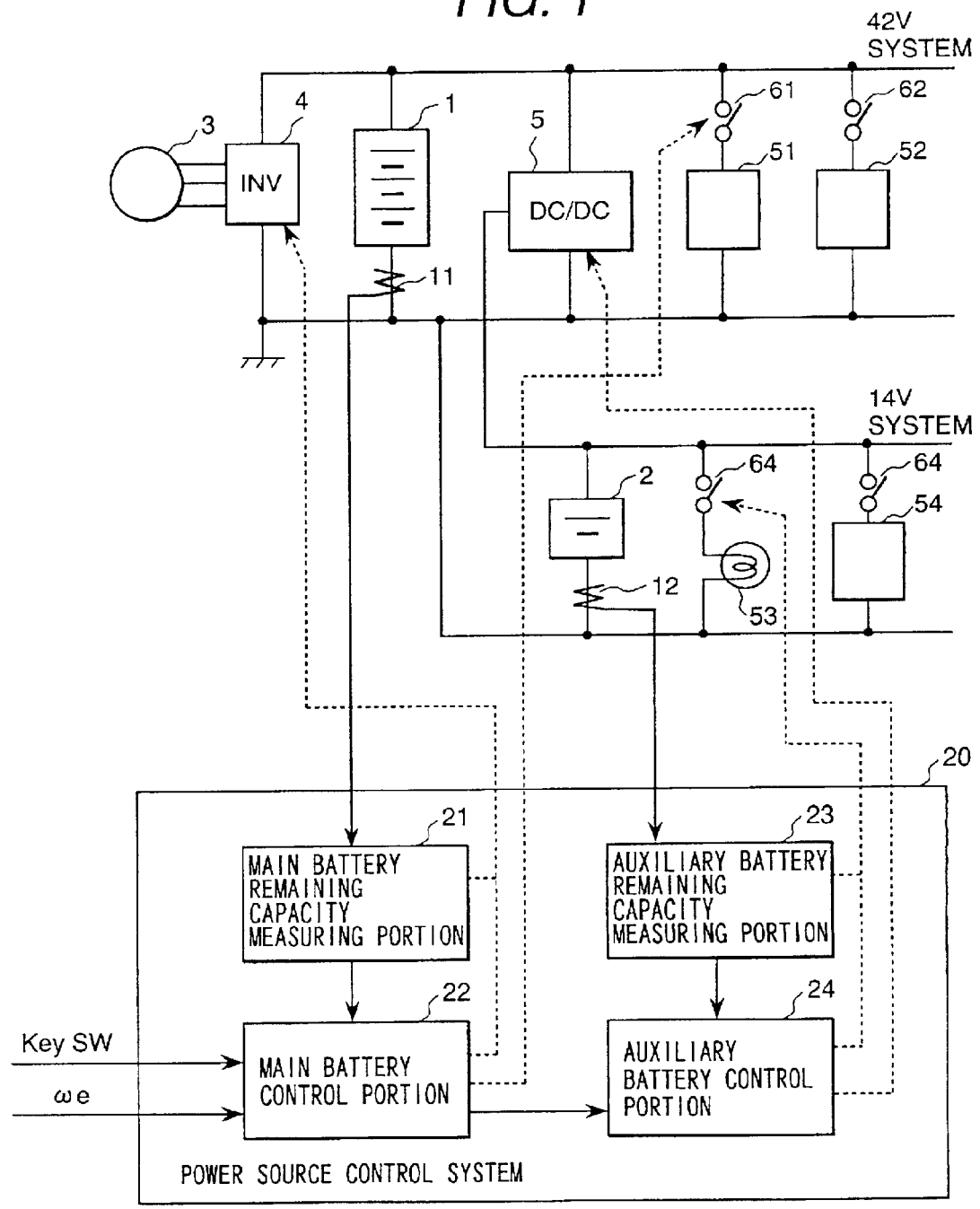
FIG. 1 is a block diagram showing one embodiment of a control system for an automotive power supply according to the present invention.

FIG. 1 shows one embodiment of the control system for an automotive power supply according to the present invention, which will be discussed as an example, that includes a main battery 1 of a 42V system and an auxiliary batter 2 of a 14V system. A motor/generator 3 is connected to the main battery 1 via an inverter 4. The motor/generator 3 is operated as a starter upon start up of the engine and as a generator for supplying an electric power to a load when the engine is running. The auxiliary battery 2 of the 14V system is charged by the main battery 1 via a DC/DC converter 5.

To the 42V system and the 14V system, a large number of electrical loads 51, 52, 53 and 54 are connected. To the 42V system, an electrically actuated or motor driven air conditioner 51 or a high power load 52, such as an electrically actuated or motor driven power steering system are mainly connected. Loads to be connected to the 14V system include lamp loads 53, such as a head lamp, parking lamp. (For lamps that are connected to the 42V system, the filament must be made thinner, which is disadvantageous in terms of longevity. Therefore, it is typical to connect the lamps to the 14V system.) Load 54 for low voltage operation, such as a power supply of the control system is also connected to the 14V system.

A power supply control system 20 includes a main battery remaining capacity measuring portion 21, an auxiliary battery remaining capacity measuring portion 23, a main battery control port ion 22 and an auxiliary battery control portion 24, and provides commands to the inverter 4 and to the DC/DC converter 5, depending upon size of the electrical loads 51 to 54 and the remaining capacities of the batteries 1 and 2. On the other hand, the power source control system 20 operates to prevent a reduction of the remaining capacities of the batteries 1 and 2 by shutting off switches 61, 62, 63 and 64 of the electrical loads, as required.

The main battery residual capacity measuring portion 21 measures the remaining capacity of the main battery on the basis of information from a current sensor 11. The auxiliary battery remaining capacity measuring portion 23 measures the remaining capacity of the auxiliary battery 2 on the basis of information from another current sensor 12. For example, such measurements can be performed by integrating charge and discharge current flowing through the battery. Alternatively, a method for performing such measurement from a voltage and a current of the battery may be used, and the remaining capacity derived by the integrated value of the current can be corrected by a voltage and current value. On the other hand, any suitable measuring method may be used, adapting to the kind of battery (lead, nickel hydride, lithium ion and so forth).

The main battery control portion 22 controls charging and discharging of the main battery 1 using information concerning the remaining capacity measured by the main battery remaining capacity measuring portion 21, key switch information KeySW, and information of engine speed ωe.

Figure 2:
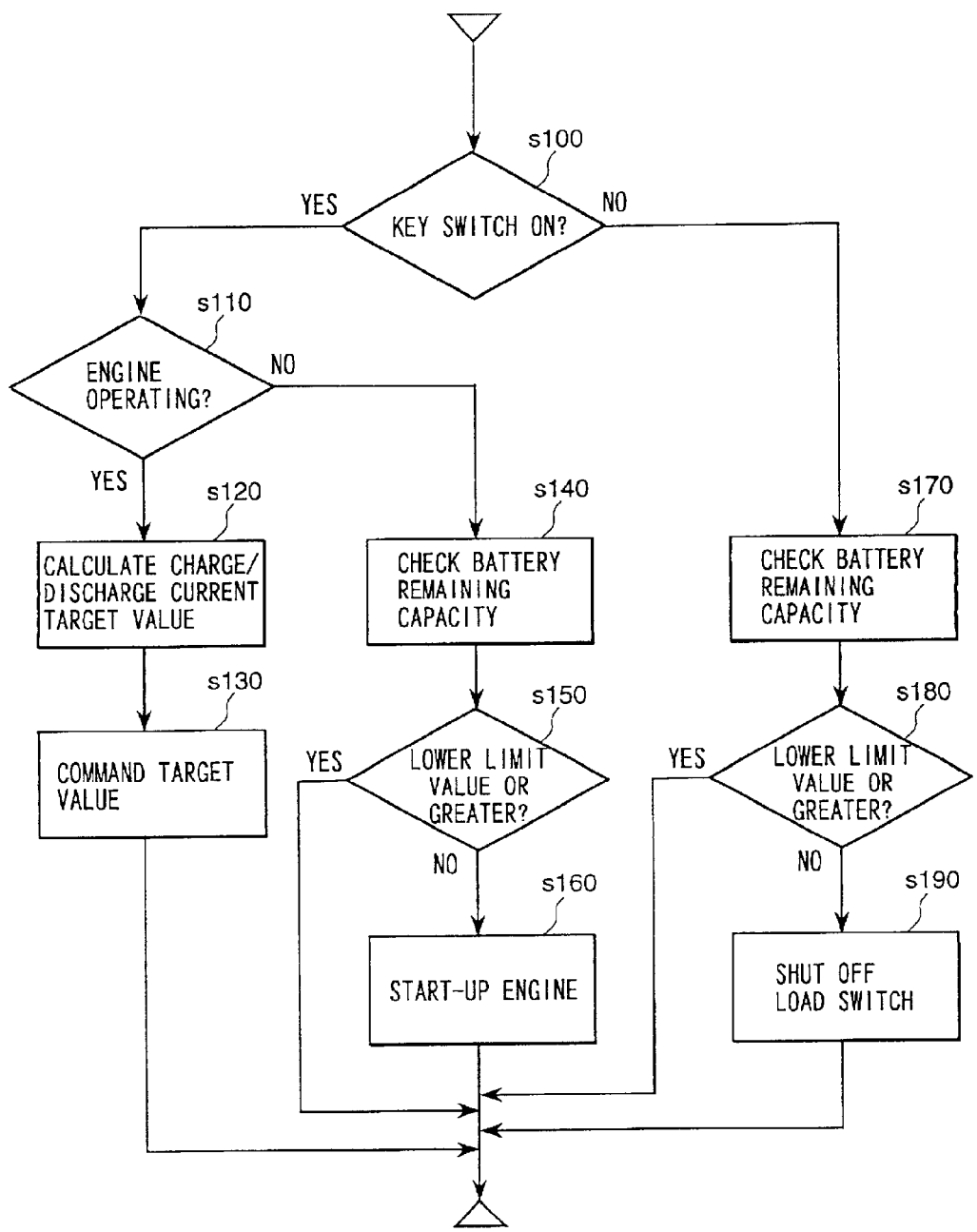
FIG. 2 is a flowchart showing the operation of a main battery control portion to be employed in one embodiment of the control system for the automotive power supply according to the present invention.

FIG. 2 is a flowchart showing operation of the main battery control portion 22, according to one embodiment of the present invention.

At step s100, the main battery control portion 22 makes judgment whether the key switch is ON, based on the key switch information KeySW. When the key switch is ON, the process is advanced to step s110, and when the key switch is OFF, the process is advanced to step s170.

When the key switch is ON, at step s110, the main battery control portion 22 makes judgment whether the engine is in operation. When it is, the process is advanced to step s120, and when it is not, the process is advanced to step s140.

When the key switch is ON and the engine is operating, at step s120, the main battery control portion 22 calculates a target value for charging and discharging current of the battery, depending upon remaining capacity of the battery measured by the main battery remaining capacity measuring portion 21. In particular, the target value for charging and discharging current is set depending upon the difference between the remaining capacity of the battery and a target remaining capacity. For example, assuming that remaining battery capacity is 70% (taking fully charged condition as 100%), if the current remaining capacity is 60%, a charge current target value is derived by multiplying a difference of 10% by an appropriate coefficient.

Next, at step s130, the main battery control portion 22 provides the current target value calculated at step s120, to the inverter 4 as the command. Since a difference between the generation output of the motor/generator 3 and the load power is applied to charge the battery, in the inverter 4, the generation output of the motor/generator 3 is controlled so that the battery current becomes the commanded current target value.

As a result of the above, when the key switch is ON and the engine is in operation, the main battery control portion 22 effects control so that the motor/generator 3 is operated as a generator driven by the engine, for supplying electric power to the electrical load.

Next, when the key switch is ON and the engine is not in operation, at step s140, the main battery control portion 22 checks whether or not the remaining capacity of the main battery 1 as measured by the main battery remaining capacity measuring portion 21 is lowered below a predetermined lower limit from time to time (a value capable of outputting electric power necessary for starting up the engine). For example, the lower limit is preliminarily determined at 30% of full charge. The characteristics are different depending upon the kind of the battery, and the output characteristics vary depending upon the temperature. The lower limit is set in consideration of this.

At step s150, the main battery control portion 22 determines whether the remaining capacity is greater than the lower limit value or not. If the remaining capacity is greater than the lower limit value, the process ends. If the remaining capacity is smaller than the lower limit value, the process is advanced to step s160.

When the remaining capacity becomes smaller than the lower limit value, the main battery control portion 22 provides a command for starting up the engine for the inverter 4 at step s160. When the engine is started up, since the motor/generator 3 is operated as a generator, the remaining capacity of the main battery 1 will not be lowered any further.

For example, in case of the vehicle having an idle stop function, when the vehicle stops at the traffic signal, the engine is stopped automatically. When the electrically actuated air conditioner 51 is kept in operation even while engine operation is interrupted, the remaining capacity of the main batter 1 may fall below the predetermined lower limit value, causing difficulty in re-starting of the engine. Even when such idle stop function is provided, lowering of the remaining capacity of the main battery can be prevented by starting up the engine through steps s140 to s160 to enable re-starting of the engine.

While the engine operation is interrupted by the idle stop function in the foregoing example, the same is also true even in the case when the vehicle is stopped at a motor tool in boarded condition. Similarly, an electrically actuated air conditioner can be operated at stopping of the vehicle without starting up the engine. In this case, lowering of the remaining capacity of the main battery can be prevented.

On the other hand, upon starting up of the engine, it is necessary to check items such as whether a shift lever is put in P (parking) range or N (neutral) range. In addition, in consideration of subsequent travel, a check is made whether fuel remains in an amount greater than or equal to a predetermined extent. When the engine cannot be started for some reason, a process is advanced to step s190 to shut off the electrical load.

On the other hand, after starting up the engine at step s160, it is possible to exhaust the fuel if the engine is operated for a long period. Therefore, remaining amount of fuel is checked to stop the engine when the remaining amount of the fuel becomes less than or equal to a certain value.

Next, consideration will be given to the case where the key switch is off, or the key is not inserted in the key cylinder. When the key switching is turned OFF, many power loads are switched off simultaneously. However, predetermined electrical loads, such as the electrically actuated air conditioner 51 and so forth may be operable even while the key switch is off.

Therefore, at step s170, the main battery control portion 22 checks whether the remaining capacity of the main battery 1 as measured by the main battery remaining capacity measuring portion 21 has fallen below the predetermined lower limit value from time to time. The lower limit value of the remaining capacity, a value capable of outputting necessary power for starting up the engine, such as 30% of full charge condition, is preliminarily set. Characteristics differ depending upon the kind of battery, and also the output characteristics can vary depending upon temperature. Therefore, the lower limit value is set in consideration with those characteristics.

Then, at step s180, the main battery control portion 22 determines whether the remaining capacity is greater than the lower limit value. If it is, the process ends. On the other hand, if the remaining capacity is smaller than the lower limit value, the process is advanced to step s190, and the main battery control portion 22 shuts off a switch 61 of an electrical load in operation. In this manner, reduction of the remaining capacity of the main battery 1 can be prevented.

When the engine may be automatically started while the key switch remains OFF, it may be possible to advance the process to step s160 to provide a command for starting up the engine. In case of parking in a tightly sealed garage, starting up of the engine is not desirable. Therefore, by providing a button for permitting starting up of the engine while the key switch is off, it may be possible to advance the process to step s160 for automatically starting the engine when the button is turned ON.

As set forth above, with the shown embodiment, even when the engine is not driven, the electrical load, such as the electrically actuated air conditioner can be actuated. Furthermore, since the remaining capacity of the battery is constantly monitored, lowering of the remaining capacity of the battery to a level at which it is incapable of starting up of the engine can be prevented. It should be noted that while discussion has been given in terms of the electrically actuated air conditioner as the electrical load, the same is true for other electrical loads, such as power window, defroster and so forth.

On the other hand, the shown embodiment is effective even in the case where the air conditioner or so forth is automatically actuated by a timer. In winter or summer, it may be desired to actuate the air conditioner in advance of starting driving of the vehicle. By setting starting time of the air conditioner by a timer, the vehicular cabin may be air conditioned at a comfortable temperature upon starting driving. When the capacity of the main battery is sufficiently large, it is possible to actuate the electrically actuated air conditioner without starting the engine. On the other hand, if the remaining capacity of the battery falls below a minimum value, either operation of the air conditioner is stopped or engine is started up automatically. Therefore, lowering of the remaining capacity of the battery can be prevented. As an electrical load to be started by the timer before starting driving, a defroster, catalytic converter heating device and so forth may be considered in addition to the electrically actuated air conditioner.

It should be noted that, at step s190, at the same time when the switch 61 of the electrical load is shut off, the power source for the power source control system 20 per se may also be shut off. When the condition at step s190 is established, it becomes unnecessary to monitor the remaining capacity of the battery until the engine is started in response to turning ON of the key switch. Since the power source control system 20 consumes a small amount of electrical power, which is wasteful power consumption, can be avoided by interrupting operation of the power source control system 20. Particularly, when the vehicle is left inoperative for a long period, shutting of the power source for the power source control system may be effective. The power source for the control system 20 which is once shut off is resumed when the key switch is turned ON.

On the other hand, at step s190, several threshold values for the remaining capacity of the battery may be provided, for shutting of the loads depending upon their priority. For example, the air conditioner can be shut off when the remaining capacity becomes lower than or equal to 30%, while the lamp load (14V system), having high importance in security, is set to operate until the remaining capacity is less than or equal to 20%. In this manner, it becomes possible to operate a load having a higher priority for a longer period.

Figure 3:
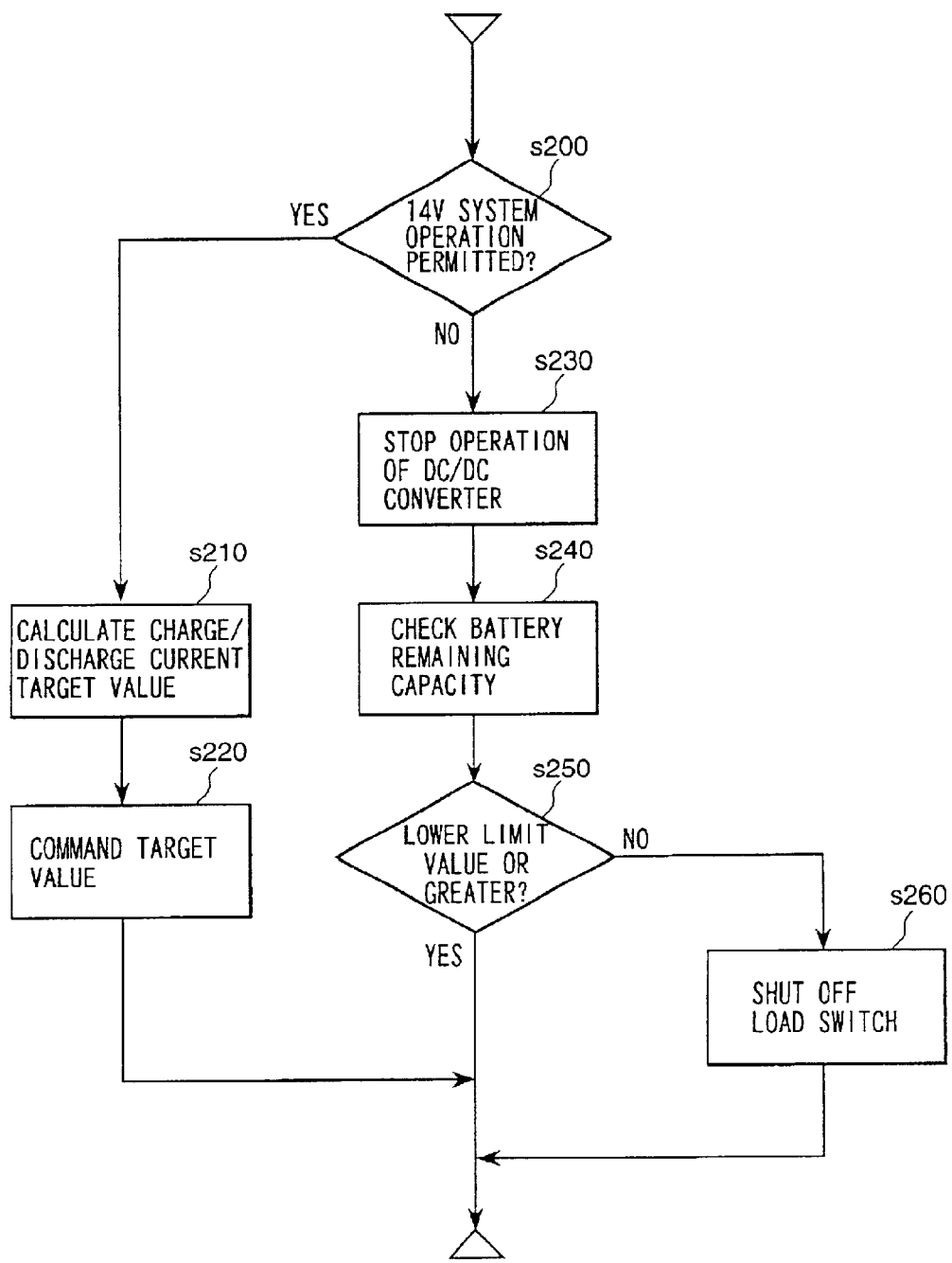
FIG. 3 is a flowchart showing the operation of an auxiliary battery control portion to be employed in one embodiment of the control system for the automotive power supply according to the present invention.

FIG. 3 is a flowchart showing operation of the auxiliary battery control portion to be employed in one embodiment of the present invention.

At step 200, the auxiliary battery control portion 24 determines whether the load for the 14V system can be operated. The main battery control portion 22 provides to the auxiliary battery control portion 24 a command whether or not the load for 14V system can be operated. Accordingly, the auxiliary battery control portion 24 makes its judgment on the basis of the command from the main battery portion 22. As viewed from the main battery side, the overall 14V system including the DC/DC converter 5 can be regarded as one of the electrical loads that can be operated even upon stopping of the engine or turning OFF of the key switch, similar to the electrically actuated air conditioner 51. Accordingly, when step s190 (FIG. 2) is reached, the main battery control portion 22 issues a command for disabling operation of the 14V system; otherwise, a signal enabling operation of the 14V system is provided to the auxiliary battery control portion 24.

When operation of the 14V system is enabled, at step s210, the auxiliary battery control portion 24 calculates a target value of charge and discharge current of the auxiliary battery 2 based on the remaining capacity of the auxiliary battery measured by the auxiliary battery remaining capacity measuring portion 23.

Next, at step s220, the auxiliary battery control portion 24 provides the target value of the DC/DC converter 5. The target value of charge and discharge current is zero in steady state to supply only load current of the 14V system by the DC/DC converter 5. When the transitional load power exceeds the maximum output of the DC/DC converter 5, the remaining capacity of the auxiliary battery 2 is reduced. The reduced capacity is compensated by charging when the load becomes lighter.

When the remaining capacity of the main battery 1 is lowered such that operation of the 14V system is impossible, the auxiliary battery control portion 24 stops the operation of the DC/DC converter 5. In this manner, power supply to the 14V system from the main battery 1 is stopped, to prevent lowering of the remaining capacity of the main battery 1.

Next, at step 240, the auxiliary battery control portion 24 checks whether the remaining capacity of the auxiliary battery 2 measured by the auxiliary battery remaining capacity measuring portion 23 is greater than or equal to a predetermined lower limit value. Even when the operation of the DC/DC converter 5 is stopped, the capacity of the auxiliary battery remains, a load of the 14V system, such as the lamp load 53, can be operated.

Then, at step s250, the auxiliary battery control portion 24 determines whether the remaining capacity is greater than or equal to the lower limit value. If the remaining capacity is greater than the lower limit value, the process ends. If the remaining capacity is smaller than the lower limit value, the process is advanced to step s260.

When the remaining capacity of the auxiliary battery 2 has fallen below the lower limit value, the auxiliary battery control portion 24 shuts off the switch 63 of the electrical load of the 14V system, at step s260. In this manner, lowering of the remaining capacity of the auxiliary battery 2 can be prevented.

Because the auxiliary battery does not influence starting of the engine, even when the remaining capacity becomes zero, it is possible to skip the processes of steps s240 and s260. Depending upon the kind of battery, zeroing of the remaining capacity may affect the life of the battery, a lower limit value of the remaining capacity may be set for checking from time to time.

In the method set forth above, when the lamp load 53 connected to the 14V system or so forth is kept ON upon turning OFF of the key switch, the DC/DC converter 5 keeps operation until the remaining capacity of the main battery 1 is lowered to the lower limit value for supplying power to the load, and subsequently, the power is supplied to the load from the auxiliary battery 2 until the remaining capacity of the auxiliary battery 2 is lowered to the lower limit value.

In the foregoing discussion, while the auxiliary battery remaining capacity measuring portion 23 is provided, if it is not necessary to manage the remaining capacity, a method to control only by the voltage of the battery may also be used. In such case, the voltage of the 14V system is detected by a voltage sensor, and the DC/DC converter 5 may be controlled so that the voltage follows the target value.

While the foregoing discussion has been in terms of 42V system of the main battery and 14V system of the auxiliary battery, the present invention is effectively applicable at any value of voltage. Even when the voltage of the main battery is as high as 200 to 300V (as for a hybrid drive type vehicle), the present invention is applicable.

As set forth above, according to the shown embodiment of the present invention, the electrical load, such as the electrically actuated air conditioner, lamps and so forth may be operated even when the engine operation is interrupted or key switch is OFF, while reduction of the remaining capacity of the main battery is prevented.

On the other hand, by making the capacity of the auxiliary battery smaller, system cost can be reduced.

Construction and operation of another embodiment of the present invention will now be discussed with reference to FIG. 4.

Figure 4:
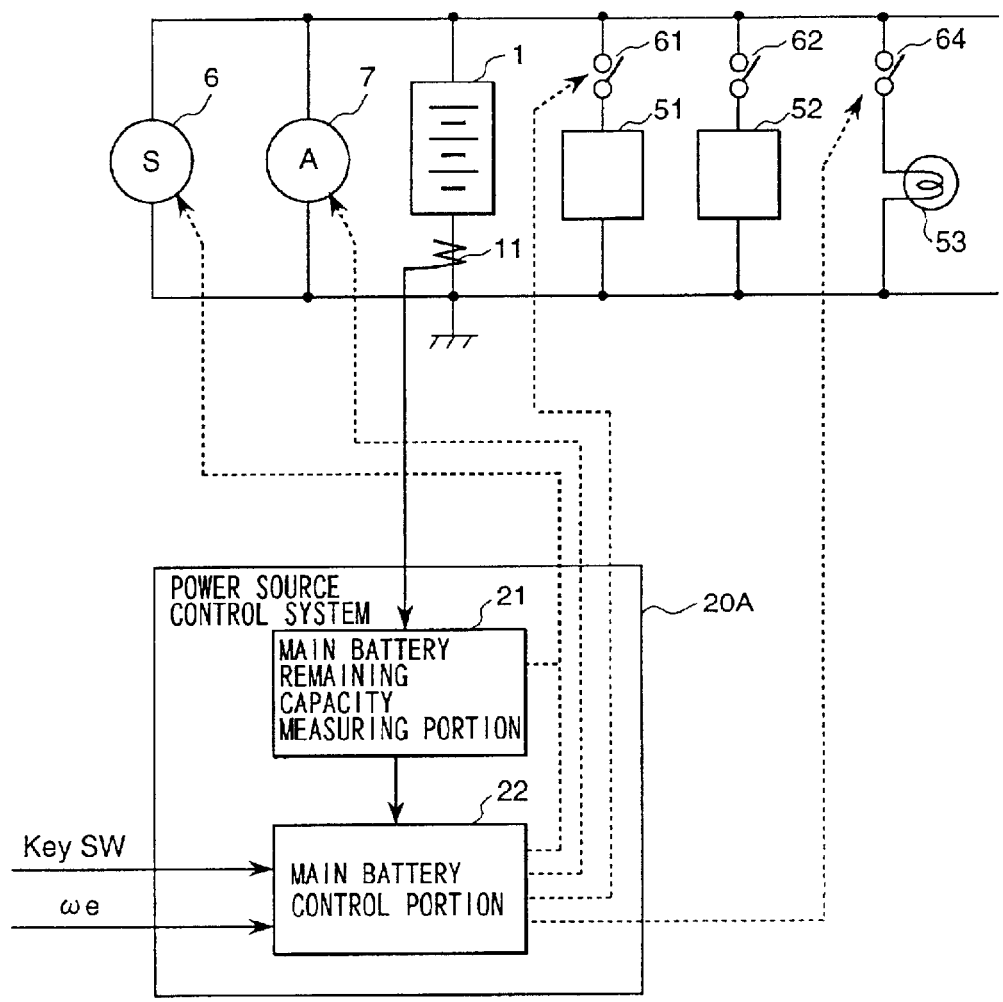
FIG. 4 is a block diagram showing another embodiment of a control system for an automotive power supply according to the present invention.

FIG. 4 shows the construction of another embodiment of the control system for the automotive power source system according to the present invention. It should be noted that like reference numerals to those in FIG. 1 identifies like components, and detailed discussion for such common components will be omitted to avoid redundant disclosure, and to facilitate clear understanding of the invention.

In the shown embodiment, in place of the motor/generator 3 shown in FIG. 3, a typical starter 6 and an alternator 7 are employed. The battery is only a main battery 1 of 14V system. Accordingly, the power source control system 20A has a main battery remaining capacity measuring portion 21 and a main battery control portion 22A.

Operation of the main battery control portion 22A is basically similar to the flowchart shown in FIG. 2. However, at step s130, the main battery control portion 22A provides a current target value (calculated at step s120) to the alternator 7 as a command. By adjusting a field voltage of the alternator 7, generated power is adjusted toward the target value. A difference between the output of the alternator 7 and the load power is applied to charge the battery.

On the other hand, when the remaining capacity falls below the lower limit value, the main battery control portion 22A provides a command for starting the engine for the starter at step s160. Once the engine is started, power is generated by the alternator 7. Therefore, the remaining capacity of the main battery is not lowered further.

As set forth above, by the shown embodiment, not only for a 42V power supply having a motor/generator, but also in a system constituted of a starter and an alternator, or the power supply having only a main battery of 14V, the electrical load, such as the electrically actuated air conditioner, lamps and so forth can be operated, even while the engine is stopped and the key switch remains OFF, without lowering the remaining capacity of the main battery.

On the other hand, in an automotive power supply having a main battery and an auxiliary battery, it is possible to operate the power of the low voltage system while the key switch is OFF even when the capacity of the auxiliary battery is small.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A control system for a power supply for an automotive vehicle, said control system comprising:

a control portion which controls operation of a power generator and an electrical load connected to the power supply; and remaining capacity measuring means for measuring a remaining capacity of a battery; wherein said control portion operates a predetermined power load when an engine of said vehicle is stopped or a key switch is OFF; and said control portion causes operation of said power load to be stopped when a remaining capacity of the battery measured by said remaining capacity measuring means falls below a predetermined value.

2. The control system for an automotive power supply as set forth in claim 1, wherein:

said control portion sets a plurality of threshold values for the remaining capacity of the battery, said threshold values corresponding to priorities of respective elements of said power load;

said control portion sequentially stops elements of the power load having a low priority in sequential order in response to a lowering of remaining capacity of the battery.

3. The control system for an automotive power supply as set forth in claim 1, wherein said control portion operates a predetermined power load when the engine is stopped or the key switch is OFF, and starts the engine when remaining capacity of the battery is lowered below a predetermined value.

4. The control system for an automotive power supply as set forth in claim 3, further comprising a setting switch for controlling whether starting of the engine is permitted when the key switch is OFF, wherein when said key switch is OFF, said control portion starts the engine only when said setting switch is ON.

5. The control system for an automotive power supply as set forth in claim 1, wherein said control portion's stopping operation of said power load when the remaining capacity of the battery becomes smaller than a predetermined value includes stopping operation of the control system itself.

6. The control system for an automotive power supply as set forth in claim 6, wherein said control portion resumes operation when the key switch is turned ON after once stopping the operation of the control portion itself.

7. A control system for an automotive vehicle power supply having a control portion which controls a power generator or power load connected to the power supply, said control system comprising:

remaining capacity measuring means for measuring a remaining capacity of a main battery and an auxiliary battery; and a voltage converter for charging from the main battery to the auxiliary battery; wherein said control portion causes operation of said voltage converter when a vehicle engine is stopped or a key switch is OFF, and stops operation of said voltage converter when remaining capacity of the main battery falls below a predetermined value.

8. A power supply control system for an automotive vehicle having an engine that drives an electric generator for charging a vehicle battery, and a control unit which controls operation of the generator and of elements of an electrical load that are coupled to the generator and to the battery; said control system comprising:

means for determining whether a key switch of said vehicle is in an on state;

means for determining whether said engine is operating; and means responsive to a determination that said key switch is off, or that said key switch is on and the engine is not operating, for measuring a remaining charge of said battery; wherein said control unit disables operation of said elements of said load when the remaining charge is below a predetermined value at a time when either said key switch is off, or said key switch is on and said engine is not running.

9. The power supply control system for an automotive vehicle according to claim 8, wherein said control unit includes a sequence of successively decreasing threshold values for said remaining charge, which threshold values correspond to a sequence of priorities assigned to said elements of said load; and said control unit disables said elements of said load in sequence according to said assigned priorities, in response to decreasing of said remaining charge.

* * * * *